United States Patent [19]
Jager

[11] 3,923,150
[45] Dec. 2, 1975

[54] DEVICE FOR CONVEYING OBJECTS

[75] Inventor: Werner Jager, Eriskirch, Germany

[73] Assignee: Firma Industrie Treuhand AG, Switzerland

[22] Filed: Apr. 8, 1974

[21] Appl. No.: 459,240

[30] Foreign Application Priority Data
Apr. 9, 1973 Germany............................ 2317742
June 18, 1973 Germany............................ 2331019

[52] U.S. Cl. ......... 198/127 R; 193/35 MD; 193/36; 193/37; 198/20 R
[51] Int. Cl.² ........................................ B65G 13/02
[58] Field of Search .................. 193/35 MD, 37, 36; 198/127, 20 R, 25; 308/20; 29/110, 116

[56] References Cited
UNITED STATES PATENTS

| | | | |
|---|---|---|---|
| 384,220 | 6/1888 | Treat.............................. | 198/127 R |
| 1,094,219 | 4/1914 | Kennedy...................... | 198/127 R |
| 1,123,851 | 1/1915 | Cooper....................... | 193/35 MD X |
| 1,959,157 | 5/1934 | Eggleston..................... | 198/127 R |
| 2,602,536 | 7/1952 | Eggleston..................... | 198/127 R |
| 2,609,917 | 9/1952 | Gotthardt...................... | 198/127 R |
| 3,356,236 | 12/1967 | Shaw ........................ | 193/35 MD X |
| 3,374,878 | 3/1968 | Kornylak...................... | 198/127 R |
| 3,552,541 | 1/1971 | Riggs................................. | 198/127 |
| 3,645,379 | 2/1972 | Kornylak........................ | 198/127 R |
| 3,804,230 | 4/1974 | Krivec ...................... | 193/35 MD X |

FOREIGN PATENTS OR APPLICATIONS
2,021,164 12/1971 Germany...................... 193/35 MD

*Primary Examiner*—James B. Marbert
*Assistant Examiner*—James L. Rowland
*Attorney, Agent, or Firm*—Burns, Doane, Swecker & Mathis

[57] ABSTRACT

An article conveyor includes track sections that comprise a rotary sleeve. Recesses formed in the sleeve carry rotatable spheres whose diameters are larger than the recesses. The spheres can be arranged with their inner ends projecting into an inner bore of the sleeve for free unobstructed rotation. Alternatively, there is provided a support member within the sleeve having a support surface which rotatably engages inner portions of the spheres. The sleeve and support surface can be mounted for relative rotation, and with the sleeve or support member being driven to frictionally rotate the spheres. The support member can comprise a tubular belt which is driven axially through the sleeve to rotate the spheres about axes that are transverse to the sleeve axis.

11 Claims, 14 Drawing Figures

DEVICE FOR CONVEYING OBJECTS

The invention relates to a device for conveying objects comprising track sections for deflecting said objects at any desired angle relative to the direction of conveyance and for accumulating same, the track sections containing shafts with deflecting rollers, and the deflecting rollers having rotary structures over which the conveyed objects roll.

In hitherto known conveying devices of this type the advance of the conveyed objects is generally effected by means of small rollers or wheels which are mostly arranged crosswise with respect to each other.

In a further known conveying device of the initially described type the deflecting rollers of each track section are designed as supporting members for rotary structures of barrel or roller shape which are secured in a plane perpendicular to the axis of the deflecting roller. The deflecting roller effects the advance of the conveyed goods in a direction perpendicular to the axis of the deflecting roller, while the barrel-shaped rotary structures effect the advance of the conveyed goods in a direction parallel to the axis of the deflecting roller in case said goods are to be guided or deflected out of the main direction of conveyance, for instance.

Deflecting rollers of such a design have considerable drawbacks. Thus, for instance, their manufacture is extraordinarily complicated and expensive, since the production of the barrel-shaped rotary structures and the production of the deflecting rollers provided as supporting members for the rotary structures is difficult. In addition, the assembly and the installation of such a deflecting roller requires considerable time, which further contributes to the expenses. Moreover, such a deflecting roller operates with quite a safety hazard, because in view of the numerous projecting edges, interstices, and the like of a so designed deflecting roller the clothing and even the hands of operating personnel may be torn, endangered, or injured.

Furthermore, the embodiment of the known deflecting rollers has the disadvantage of easily leading to damage of conveyed objects which do not have sufficient resistance per se, such as soft cartons, bags and the like. Therefore, filled sacks, plastic bags etc. cannot be transported with such devices, which confines their applicability to the conveyance of relatively hard articles, e.g. stiff boxes and the like. In case of soft goods point-wise support on the known deflecting rollers is not warranted, so that there is not only a high risk of damage to such goods during conveyance, but also no guarantee of perfect transportation thereof.

Finally, the possibility of free choice of shaft diameter for the deflecting roller is rather limited in upward direction, so that it is not possible to adapt said shaft diameter to varying stress for conveying different objects within the desired wide load range.

Therefore, it is the object of the invention to eliminate these disadvantages and to provide a conveying device the deflecting rollers of which can be manufactured easily, simply and rapidly and ensure that the desired function is performed over a long period of time in an improved manner and without limitation and operate without the hitherto existing high safety hazard.

The features of the conveying device provided for the attainment of this object are apparent from the patent claims.

In the conveying device of the invention it is contemplated that the deflecting rollers consist of cylinder units having recesses in their surface, and that the rotary structures are designed as spheres provided and held in said recesses, the sphere diameter being greater than the diameter of the recesses.

According to the invention, each deflecting roller may have at least two spaced peripheral rows of spheres, the spheres of each row being uniformly spaced from one another. The spheres of one peripheral row may be aligned with respect to those of the other peripheral row. However, according to the invention it is also possible that the spheres of one peripheral row are offset relative to those of the other peripheral row.

In order to simplify the manufacture it is advisable that each deflecting roller consists of an integral sleeve-like member which may be manufactured from plastic material by injection molding, for instance.

The spheres of each peripheral row may be mounted or arranged for free rotation in a separate cylindrical disk. In this modification it is favorably possible to combine one of the sphere-studded cylindrical disks with one or more additional identically shaped disks, which may be accomplished in the above mentioned way such that the spheres of the peripheral rows are aligned or offset relative to each other.

Depending on the load exerted by the conveyed objects, it is further contemplated by the invention that each two adjacent spheres of a peripheral row are spaced apart an angular distance not exceeding 120°. When the spheres have a maximum angular distance of 120° from one another there are three spheres in one peripheral row. The more acute said angle is selected, the more spheres are on the deflecting roller, which implies that the spheres have a greater load bearing capacity. On the other hand, this implies that the conveyed objects are stressed to a lesser extent at points where they rest on the spheres, which is especially significant in case of delicate objects which may be subjected to only slight specific stress without being damaged. Consequently, in extreme cases the angular distance between two adjacent spheres of a peripheral row may become very small.

Suitably each deflecting roller has a plurality of apertures distributed over its surface in the form of slots or the like for admitting dirt, dust and the like. Thereby any dirt, dust, sand etc. carried to the upper side of the deflecting rollers during operation of the device can fall into the slots and out of the slots on the underside of the deflecting roller, without adversely affecting the operation of the spheres. Instead of slots the apertures for admitting dirt may also be provided in the form of one or more recesses in which there are no spheres. The amount of entrained dirt may also be taken into consideration already during the insertion or the arrangement of the spheres in that the clearance of the spheres in the recesses is selected accordingly, e.g. somewhat larger.

In a further favorable embodiment of the invention each deflecting roller has the cross section of a prismatic body, the enveloping line around the edges forming the cylinder unit and the spheres being accommodated in the recesses provided in a plurality or all of the side faces. Of course, it is also possible to provide the spheres at the edges between two side faces of the prismatic body.

According to a preferred embodiment each deflecting roller may be supported on an inner supporting member on which the spheres rest in a freely rotatable manner. The supporting member may, in turn, be supported on a shaft either corotatively or loosely, i.e. freely rotatably. The deflecting roller together with the spheres may be freely rotatable relative to the supporting member. To this end it may be advisable to provide in the supporting member races for the spheres in peripheral direction.

According to another preferred embodiment the deflecting roller, when driven in crosswise direction, for instance, may also be rigidly connected to the sphere-supporting member. According to the invention it is contemplated that the supporting member has perforations with diameters smaller than the sphere diameters in which the spheres partially extending into the interior of the supporting member are held freely rotatably.

Each deflecting roller suitably has one confining and/or supporting disk each at its end faces. Each supporting disk may be designed as a coupling disk for two deflecting rollers to be combined, so that it is possible by means of said supporting disks to couple any desired number of individual deflecting roller units to form a roller assembly.

In a third preferred embodiment the spheres are mounted for free rotation directly in the recesses of the deflecting roller by means of inserted sphere holding means or sphere seats shaped into said recesses.

In order to intensify the effect to be achieved with the deflecting roller, for instance regarding the deflection at any desired angle relative to the direction of conveyance, the invention permits a construction such that the spheres of each deflecting roller can be separately interiorly driven in a direction parallel to the axis of the deflecting roller by means of a controllable cross drive which is provided within the deflecting roller or within the supporting member.

Said cross drive may consist, for instance, of an endless belt passed through the interior of the deflecting roller in axial direction and contacting and driving with its external surface the surfsce of the spheres extending into the interior of the deflecting roller. The conveyor belt may be either flat or tubular in the conventional manner.

Finally, in a further embodiment of the invention the two outer supporting disks confining one or a plurality of deflecting rollers may have external and/or internal bearing means when the deflecting rollers are cross-driven.

The deflecting roller of the invention offers numerous advantages. Thus, as a whole, the deflecting roller serves as a very simple and at the same time very effective control element for any desired changes of the direction of conveyance of piece goods. In the embodiment where one or more deflecting rollers are provided in the form of cylinder units on the optionally prolonged supporting member the space between the supporting member and the deflecting roller is predetermined by the spheres seated in the deflecting rollers. The sphere portions extending beyond the outer periphery of the deflecting rollers permit easy loading and unloading of piece goods which may be boxes, bags, crates etc. Such a deflecting roller is assembled, for example, in that all the spheres are placed from inside into their respective recesses and held there by externally provided and applied magnets until the supporting member has been inserted into the space left free by the spheres. When the attractive force of the magnets exerted on the spheres is eliminated, the spheres can no longer shift from their positions as they are held in said embodiment between the supporting element and the associated recesses in the cylinder unit.

The lateral supporting disks may serve either for corotative support of the deflecting rollers or only for lateral confinement of said deflecting rollers. In the latter case the deflecting roller is additionally freely rotatable relative to its supporting member so that there is relative movement between the deflecting roller and the supporting member during operation of the device.

Aside from the fact that the deflecting roller may be mounted for free rotation, the spheres also compensate relative movement between the desired advance of the conveyed objects and the normal conveying movement of the deflecting rollers. Hence, it is possible to perform inlet guidance and outlet guidance in any direction regardless of a specific angle. The same applies to the performance of twisting and turning motions on the conveyor device, the number of successive motions and the duration of the motion — no matter whether several twisting, turning or deflecting motions are concerned — being insignificant.

The dust and dirt entrained during the operation of the deflecting roller may escape through the apertures (slots or the like) especially provided for this purpose in each cylinder unit, or it may fall through the space which may optionally be deliberately left between sphere and sphere seat (recess) in the form of a clearance. In the latter case the recess is suitably conically tapered inwardly. The entraining force of the spheres in the direction of advance perpendicular to the axial direction may be increased materially when the member for supporting the spheres has concave depressions or even perforations. The increase in entraining force enhances the advance also with the use of inlet and outlet guide means. Furthermore, it is possible to drive the individual members by arranging them crosswise in two directions, for instance at right angles relative to each other. In such an embodiment the deflecting rollers arranged in crosswise fashion are able, by means of two controllable drive means, to automatically perform any desired change of direction. Of course, these changes of direction may be effected also by guide members which may be loose or positively movable, or by pushing means. When the deflecting rollers are arranged crosswise it is possible to perform inlet and outlet guidance without additional lifting motions and to effect the desired outlet guidance while the conveyed objects are being continuously advanced. Furthermore, also the frequently required accumulation of conveyed objects can be easily accomplished. When the deflecting rollers are freely rotatable on their supporting members, the additional adjustability of the individual tracks in vertical direction (both centrally and marginally) offers more effective reduction of the pile-up pressure.

The invention is based on the idea to design the deflecting roller such that the sleeve-like cylinder unit imparts the required guidance to the spheres inserted into its jacket. By virtue of their design and seating the spheres are able to impart to the conveyed objects every required direction of guidance. When the conveyed objects are to be accumulated one after the other, this can be effected by means of the relative motion of the deflecting roller spheres which they perform relative to the rotating or relative to the non-rotating supporting members of the deflecting rollers. The "controllable" accumulating capacity is materially increased when the deflecting rollers are mounted for free rotation on the supporting members.

Furthermore, it is a feature of the deflecting roller of the invention that so-called "rolling friction" in the form of a roll-off motion takes place, rather than sliding friction between the conveyed objects and the spheres. It is a further advantage that with the deflecting roller designed according to the invention the hitherto existing safety hazards are eliminated, as the fingers and hands of personnel coming into contact with these deflecting rollers are no longer in danger of being squeezed or otherwise injured, and the clothing of this personnel can no longer be torn. This is due to the fact that there are exclusively round parts, rather than sharp edges, in the guiding direction of the deflecting rollers or the spheres. Moreover, in driven conveyors piece goods cannot get jammed, since the spheres and optionally the deflecting rollers may additionally perform free roll-off motions.

During operation of the deflecting rollers they can be set in motion by arranging the rollers horizontally and advancing the piece goods manually; moreover, the objects can also be advanced in that the entire conveyor device is inclined and operates by gravity, or that the objects are moved by pushing and swinging means. Finally, the deflecting rollers may be moved in that the supporting members of the deflecting rollers are positively driven. As mentioned before, the spheres of each deflecting roller may be internally separately rotated by means of a controllable cross drive. One may distinguish between the following embodiments of the invention:

a. The deflecting roller is supported on the inner supporting member for free rotation together with the spheres, and the supporting member, in turn, is corotatively mounted on a shaft. With this embodiment a great object accumulating effect may be achieved. The supporting disks provided laterally at the end faces of the deflecting roller are mounted such that the entire device may be power driven as well as manually actuated or may operate by gravity.

b. The cylinder unit of the deflecting roller which may have a circular or prismatic cross section is mounted corotatively on the supporting member which supports the spheres and which to this end may be provided with perforations for receiving the spheres. The arrangement permits the installation of cross driving means in the interior of the supporting member for the deflecting roller.

c. The deflecting roller does not have any internal supporting member; rather does the cylinder unit have inserted sphere holding means or (by injection molding) sphere seats shaped into the recesses for accommodating the spheres.

This implies that, in contrast to the hitherto known deflecting roller, the spheres or the deflecting roller of the invention may be driven in at least three ways. Thus, it is possible, on the one hand, to drive the spheres themselves, which may be done by means of the cross drive. On the other hand, it is possible to drive merely the sphere supporting member so that there results relative movement between the conveyed goods and the spheres or between the spheres and the supporting member. Finally, it is possible to drive the cylinder unit connected corotatively to the supporting member as a whole as deflecting roller.

For the hitherto known deflecting rollers the previously mentioned barrel-shaped roller structures must be manufactured separately and in an expensive way. In this respect the invention offers a further advantage in that the spheres used as rotary structures may be balls which were originally contemplated for ball bearings but which were rejected for being off size and consequently not suited for use in ball bearings. Such balls which are available at low cost can be advantageously used for the device of the invention.

All the embodiments of these deflecting rollers may be employed also in overhead conveyor systems where the deflecting rollers are used as suspended rollers. In this embodiment the rollers may be driven in various ways, for instance by means of chains with pulse control for accumulation, by means of rotating conveyor elements, by means of sliding drive and follower units for controlling the pile-up or accumulating effect, or by means of gravity and the like.

Hereinafter the invention will be explained with reference to several preferred embodiments in conjunction with the drawing. The drawing shows in FIG. 1 in a perspective exploded view the deflecting roller with a supporting member.

Figure 1:
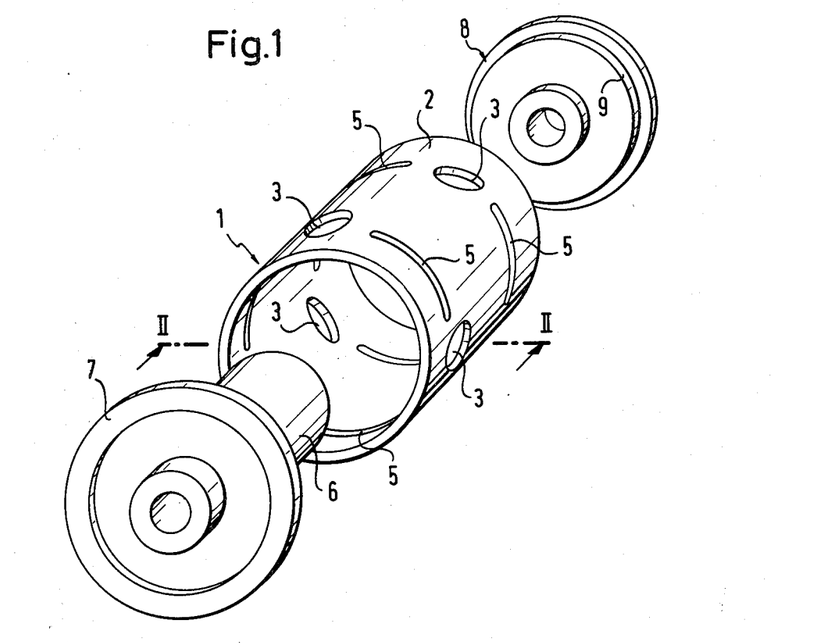
Figure 2:
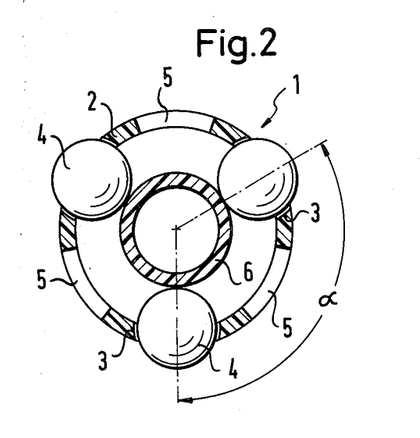
FIG. 2 a cross section along the line II—II through FIG. 1.

From the drawing, especially from FIGS. 1 and 2, it is apparent that the deflecting roller 1 has a cylinder unit 2 which, in this example, has a circular cross section and has the shape of a sleeve. The cylinder unit 2 is manufactured by injection molding in one piece and has a plurality of recesses 3 in its surface which, in the illustrated example, are uniformly distributed over the entire surface of the cylinder unit 2 in two circular rows. The recesses 3 of each two peripheral rows can be aligned or offset relative to each other. They accommodate rotary structures 4 inserted into the cylinder unit 2 from inside, as may be seen, for instance, from FIG. 2, and hold them freely rotatably with or without clearance. The rotary structures 4 are designed as spheres and extend through each associated recess 3 with a certain portion of their surface. From FIG. 2 it may be especially seen that the diameter of each sphere 4 is greater than the diameter of the associated recess 3, so that the spheres cannot fall out of their recesses 3.

Depending on the load to be carried which is determined by the goods to be transported over the deflecting rollers 1, a more or less great number of spheres 4 and recesses 3 is provided. This is reflected by the fact that two adjacent spheres 4 and recesses 3 each of a peripheral row are spaced apart an angular distance not greater than 120°. The more spheres 4 are provided in one peripheral row, the smaller is said angular distance.

Between each two adjacent recesses 3 of one row a slot 5 is provided in the surface of the cylinder unit 2 which serves to receive and discharge any entrained dirt, dust, and the like.

With their underside the spheres 4 rest on a sleeve-like supporting member 6 which has an outer diameter such that the spheres 4, when inserted into the cylinder unit 2, are relatively immobile in radial direction, while they can roll off freely on the surface of the supporting member 6. The spheres 4 are made from metal or from accordingly hard plastic, plexiglas, rubber etc., depending on the contemplated use of the deflecting roller 1, i.e. depending on the weight of the objects to be transported.

At the end faces the deflecting roller 1 is confined by one supporting disk 7 and 8 each which hold the deflecting roller 1 and the cylinder unit 2 in centered relationship. The supporting disk 7 in the example illustrated by FIG. 1 is integral with the supporting member 6 and, exactly as the supporting disk 8, it has an annular shoulder 9 of corresponding diameter at its inside on which the cylinder unit 2 rests corotatively in assembled condition of the deflecting roller 1. The hollow interior of the supporting member 6 receives the shaft for the deflecting roller 1 not shown in the drawing.

Figure 3:
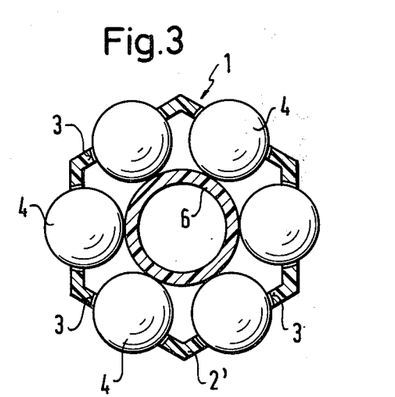
FIG. 3 a modified prismatic embodiment of the deflecting roller cylinder unit.

From FIG. 3 it is apparent that the deflecting roller 1 may also have polygonal cross section. In the illustrated example the cylinder unit 2' is a hexagonal structure, and the envelope of the edges forms a cylindrical unit. Each side face confined by two edges of the hexagonal sleeve structure receives at least one sphere 4 arranged in its associated recess 3, depending on the contemplated number of spheres.

Figure 4:
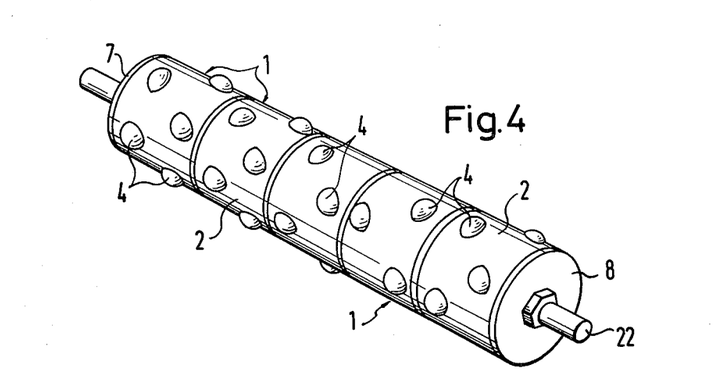
FIG. 4 a perspective view of a unit composed of a plurality of deflecting rollers with one supporting disk each between two deflecting rollers serving at the same time as coupling disk.
Figure 5:
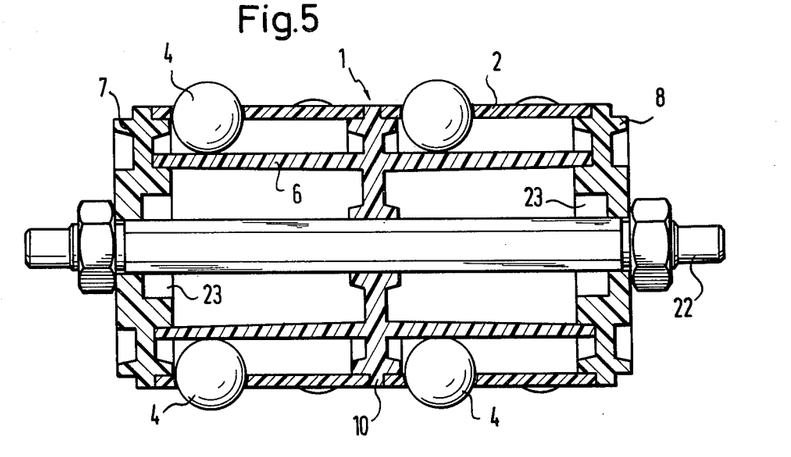
FIG. 5 a section through two of the individual deflecting rollers of FIG. 4 in a somewhat modified form.

From FIG. 4 it may be seen that a plurality of deflecting rollers 1 may be combined to a unit which, as a whole, is supported on and driven by a shaft 22. In the embodiment of FIG. 4 the supporting disks 7, 8 serve as coupling disks for each two deflecting rollers 1 to be coupled together, so that in this way the desired length of the entire unit may be easily obtained. In this respect FIG. 5 shows that one cylinder unit 2 each is coupled via supporting disk 7 or 8, respectively, for corotation with the supporting member which, in turn, rests on the supporting disks 7 and 8. The shaft 22 effecting the drive of the supporting disks 7, 8 and the deflecting roller 1, respectively, can have a hexagonal profile, for instance, which then extends through matching bores in the supporting disks 7, 8. In case the drive shaft 22 has a round cross section, the roller is driven in a suitable other way, the drive shaft 22 then being journalled in friction bearings or in ball or roller bearings which favorably are accommodated in inside recesses 23 of the supporting disks 7, 8.

Figure 6:
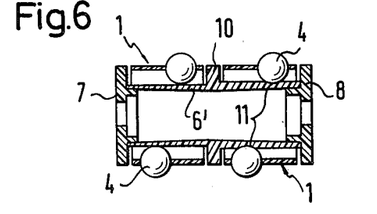
FIG. 6 in longitudinal section a rigid supporting member with freely rotatable cylinder unit.

In the example illustrated in FIG. 6 two of the deflecting rollers 1 apparent from FIG. 1 are combined to a unit. The difference resides in the fact that, aside from the design of the supporting member 6' in the manner shown in FIG. 6, the two adjacent cylinder units 2 are freely rotatable on said supporting member 6'. The spheres 4 of each cylinder unit 2 are also arranged and cradled in matching recesses 3 provided in the surface of the cylinder unit 2, and with their inwardly extending surfaces they rest on the surface of the supporting member 6'. Said member 6' is adapted for receiving a shaft (not shown) and closed laterally by means of one supporting disk 7 and 8 each which confine the adjacent cylinder unit 2 and safeguard and support the latter against displacement, together with an outer flange 10 provided centrally at the supporting member 6'. The latter may have races 11 for the spheres 4 on its outer surface, as schematically shown, for instance, on the right hand side of FIG. 6. The supporting disks 7, 8 are mounted for corotation with the supporting member 6'.

Figure 7:
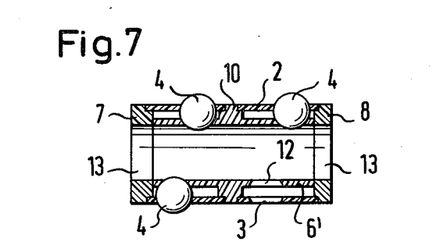
FIG. 7 a rigid supporting member with corotatively connected cylinder unit for cross drive.

In the embodiment shown in FIG. 7 the cylinder unit 2 is corotatively connected to the supporting member 6' which supports the spheres 4. To this end the supporting member 6' in the illustrated embodiment has perforations 12 whose diameter — exactly like that of the recesses 3 in the surface of the cylinder unit 2 — is smaller than the sphere diameter. In said perforations 12 of the supporting member 6' the spheres 4 are freely rotatably seated, extending partially into the interior of the supporting member 6'. The supporting disks 7, 8 and the central outer flange 10 of the supporting member 6' are designed such that the cylinder unit 2 is corotatively connected to the supporting member 6', as mentioned before. Both the supporting disk 7 and the supporting disk 8 have a central bore 13 whose inner diameter corresponds substantially to that of the sleeve-like supporting member 6'.

Figure 8:
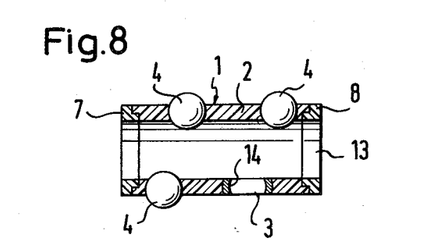
FIG. 8 a stationary cylinder unit with inserted spheres without supporting member, also for cross drive of the spheres.

In the example shown in FIG. 8 the deflecting roller 1 does not have any supporting member on which the spheres 4 could rest. Although one supporting disk 7, 8 each is provided for the centering support of the deflecting roller 1, the spheres 4 are freely rotatably mounted directly in the associated recesses 3 of the deflecting roller 1 by means of inserted sphere holding means 14 or by means of ball seats formed into the cylinder wall. In this embodiment the cylinder unit 2 has a greater thickness than the previously described embodiments to account for the greater load to be received.

Particularly in the embodiment of FIG. 6 the supporting member 6' may be either stationary or driven by means of an inserted shaft, the cylinder unit 2 then rotating freely on the supporting member 6'. In the hollow space formed by the supporting member 6' a ratchet or similar means known per se may be installed which has an escapement in one or in both directions to prevent backward travel of the conveyed goods that are being advanced over the spheres 4 in about the manner of normal or inverted coasting or, for example, to effect a change of direction when two ratchets of different resistance are arranged side by side. It is also imaginable to variably control the ratchet resistance electromagnetically; also the spheres 4 themselves may be slowed in their mobility relative to the advanced objects by electromagnets provided within the supporting member 6'.

Figure 9:
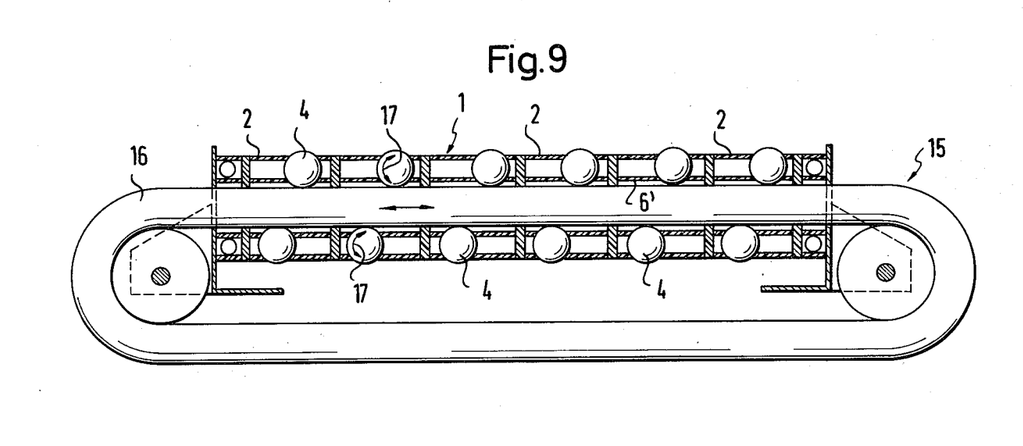
FIG. 9 a deflecting roller arrangement with cross drive.

Particularly with the embodiments of FIGS. 7 or 8 it is possible, on account of the large space available within the supporting member 6' or within the cylinder unit 2, to provide a drive means with which the spheres 4 can be caused to rotate in a plane parallel to the axis of the deflecting roller 1. In such an embodiment which is shown in cross section in FIG. 9 the deflecting roller 1 is composed of a plurality of cylinder units 2 which are corotatively connected to the supporting member 6' seating the spheres 4, similarly as shown in FIG. 7. A cross drive 15 operable in two opposite directions is provided which, in the illustrated example, comprises a flat drive means 16 in the form of a tubular belt or the like which passes through the interior of the deflecting roller 1 or through the interior of the supporting member 6' and contacts with its outer surface the surface of each sphere 4 extending into the interior of the supporting member 6'. Depending on the direction in which the cross drive 15 is moved, this causes the spheres 4 to move in a direction transversely of the main direction of advance of the conveyed objects, as shown by means of arrows 17 in FIG. 9. In this way, i.e. by means of the cross drive 15 and by means of the deflecting roller 1 standing still or driven in the main direction of advance, the conveyed objects may be advanced in any desired direction, deflected, accumulated, guided in from other track sections or out into other track sections, and so forth.

Figure 10:
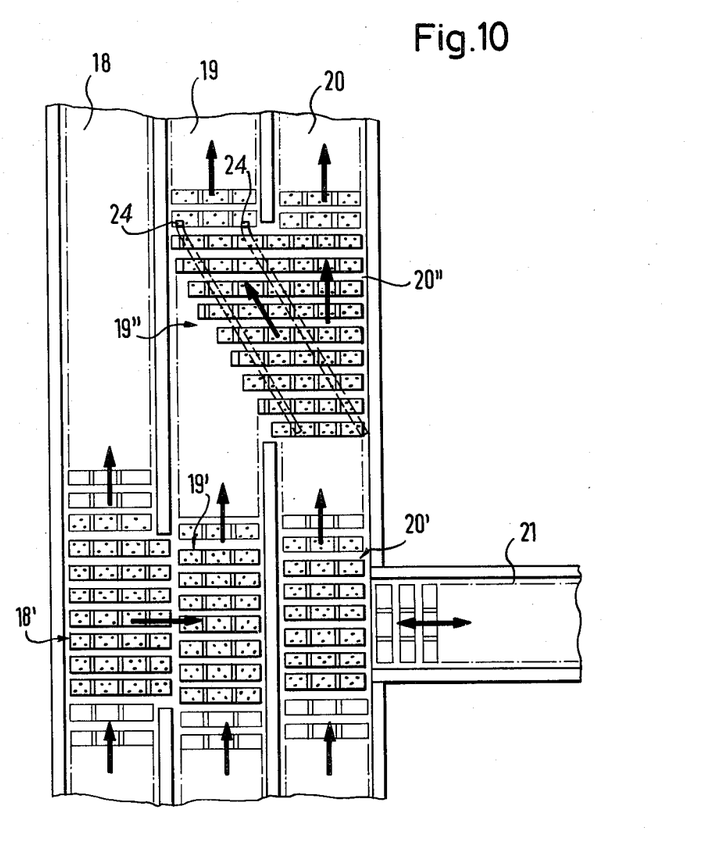
FIG. 10 a schematic plan view of a conveyor device for transporting objects using the deflecting rollers of the invention.

One example of such a conveyor device may be seen from FIG. 10 in which three parallel tracks 18, 19 and 20 are provided side by side. At the locations where the advanced objects are to change their direction of travel or are to be accumulated they have track sections 18', 19' and 19'', 20' and 20''. These track sections consist of deflecting roller units of the previously described type which are provided one behind the other in the main direction of advance and which may be driven in various ways, as initially explained. When the conveyed goods are to be transported, for instance, from track 18 to track 19, this is effected in the track sections 18', 19' such that the deflecting roller units of the track section 18' are equipped with the cross drive apparent from FIG. 9 which simply and safely carries the goods arriving at the track section 18' directly to the track section 19' of track 19.

From FIG. 10 it may be seen that to track 20 there is associated a track 21 for delivering additional objects, and to said track 21 a track section 20' is associated, in turn, at a respective location along the track 20, said track section 20' being likewise formed by a plurality of deflecting roller units of the previously described type arranged one behind the other. Of course, the track 21 may also be adapted for guiding objects out, rather than in. In the latter case the track section 20' — exactly as the track section 18' — has deflecting roller units which are provided with the cross drive 15 shown in FIG. 9. On the other hand, if the track 21 is to be used for guiding objects to track 20, the deflecting roller units of the track section 20' are constructed, for instance, in the manner shown in FIG. 6 and, as mentioned before, a drive in the main direction of advance may be provided. Incidentally, in contrast to outlet guidance, for inlet guidance it is not necessary to provide an additional drive in the form of a cross drive or the like. Finally, it is possible to transport the goods, say, from track 20 to track 19 by providing for this purpose a switch in the form of two track sections 19'', 20'' formed by deflecting roller units. At this point the conveyed objects can move from track 20 to track 19 by means of schematically shown pushers 24; or else the deflecting roller units of the track sections 19'', 20'' are also provided with a cross drive 15 — optionally in combination with a forward drive. In any event, the embodiment of the deflecting roller of the invention ensures wide applicability without any limitation in constructional respect. In addition, the described deflecting roller, due to its variable construction, can be stressed far more than the hitherto known deflecting rollers which, last not least, is due to the circumstance that in view of the possibility of selecting a larger inner diameter a supporting shaft may be employed which is subjected to far higher loads.

It may be added that the deflecting rollers may also be arranged crosswise, e.g. such that rows of deflecting rollers composed of rollers rotating about the same axis of rotation alternate with rollers rotating about parallel axes of rotation, the axis or axes of rotation of one row of rollers being disposed perpendicular to the axis or axes of rotation of the following row of rollers.

When the deflecting rollers are to be rotated transversely of their axial direction they may be driven in various ways.

One embodiment of the invention is based on the idea to install the means for driving the deflecting roller in the supporting disk which is provided for confining and/or supporting the deflecting roller at its two end faces. To this end a power transmission means for driving the deflecting roller is provided at least at one supporting disk of each deflecting roller, and the power transmission means of all deflecting rollers of a certain track length can be caused to rotate by a single drive means.

All in all, the embodiment of the invention offers the advantage that at least one of the supporting disks at each deflecting roller is provided with the required power transmission means for the deflecting roller already during its manufacture, for example in that the supporting disk is formed integral with the required power transmission means. The power transmission means which, according to the invention, may be a gear wheel may serve at the same time to confine the deflecting roller, so that this offers additional advantages regarding the goods to be transported by the deflecting rollers.

Figure 11:
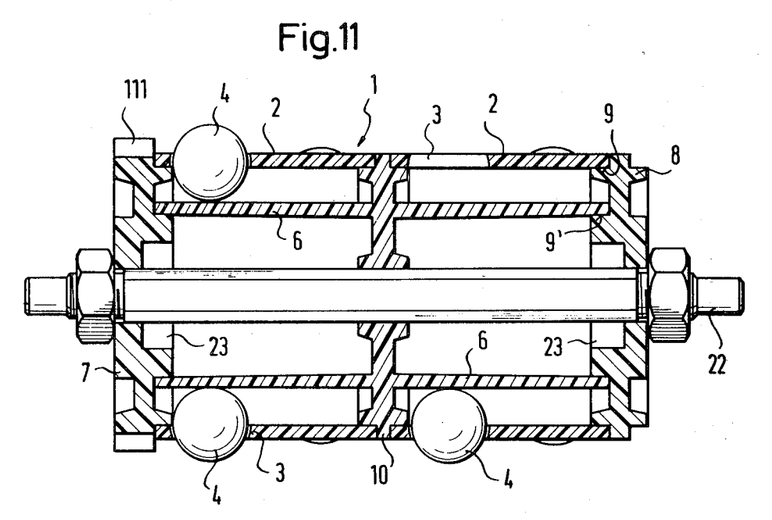
FIG. 11 an embodiment of a deflecting roller in longitudinal section substantially corresponding to FIG. 5.
Figure 12:
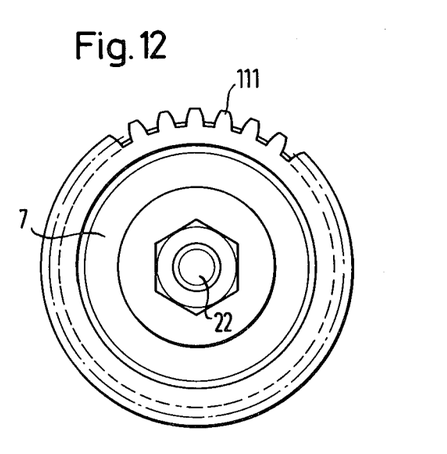
FIG. 12 a front view from the left hand side of the embodiment shown in FIG. 11.

From FIG. 11 substantially corresponding to FIG. 5 it is apparent that the deflecting roller 1 in the illustrated example comprises two identically constructed cylinder units 2 with circular cross section in sleeve form. Each cylinder unit is manufactured as an integral injection molded plastic part and provided with a plurality of recesses 3 in its surface which, in the illustrated example, are distributed uniformly over the entire surface of the cylinder units 2 in two peripheral rows either in offset of aligned relationship. The recesses 3 of the cylinder units 2 receive rotary structures 4 in the form of balls inserted from inside; the diameter of the balls is selected such that they cannot fall outwardly through the recesses 3 in the cylinder units 2 and are held in place, inter alia, by the confining walls of the recesses 3.

As described above, the balls 4 are braced inwardly, i.e. with their undersides, against a sleeve-like supporting member 6 which has an outer diameter such that the balls 4, when inserted into the deflecting roller 1, are relatively immobile in radial direction, while they can roll off freely on the outer surface of the supporting member 6.

The deflecting roller 1 is confined at its two end faces by one supporting disk 7 and 8 each which hold the deflecting roller 1 or the cylinder unit 2 in centered relationship. Both supporting disks 7, 8 have on their insides two annular shoulders 9, 9' provided in corresponding locations — as apparent from FIG. 11 — on which the cylinder units 2 and the supporting member 6 rest. In this way also the supporting roller 1 shown by way of example in FIG. 11 and composed of two combined cylinder units 2 with spheres 4 is coupled together by means of the supporting disks 7, 8; the supporting member 6 additionally has an outer flange 10 for carrying the cylinder units 2. Both supporting disks 7, 8 are connected by a shaft 22 which has a hexagonal profile. The shaft extends through matching bores in each of the supporting disks 7, 8 and is journalled in external bearings, e.g. flanged bearings.

In case the shaft 22 has a round cross section, which is also possible, the shaft 22 is supported in friction bearings or by means of ball or roller bearings which suitably are accommodated in recesses 23 in the inner faces of the supporting disks 7, 8.

The supporting disk 7 of the deflecting roller 1 has on its periphery a gear wheel 11 which is integral with the supporting disk 7 and has been manufactured together with the latter, for instance from plastic material by injection molding.

Figure 13:
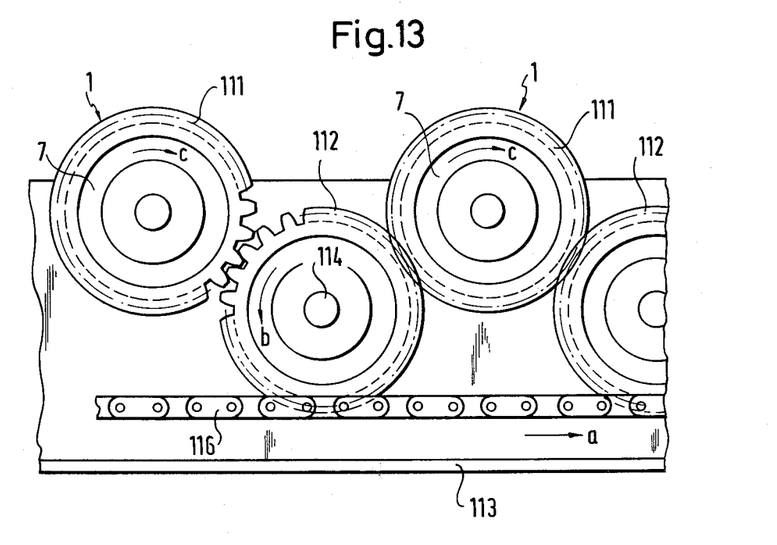
FIG. 13 a schematic side view of one possible way how to drive the deflecting rollers.
Figure 14:
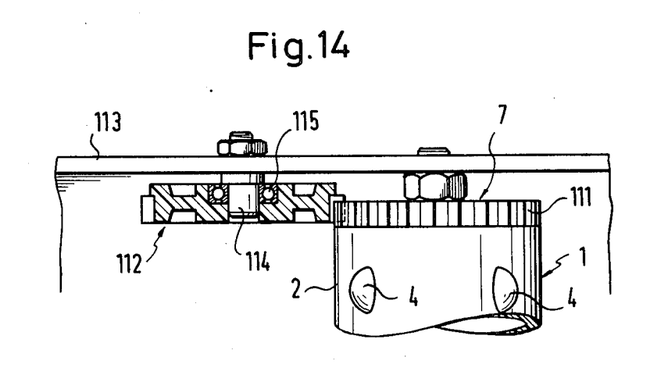
FIG. 14 a plan view thereof, partially in section.

When a plurality of deflecting rollers 1 are arranged in succession in the device for conveying objects, as in FIG. 13, they are installed such that the gears 111 provided as driving power transmission means at each supporting disk 7 of the deflecting rollers 1 are spaced apart a certain distance. It may be further seen from FIG. 13 that the gears 111 of the deflecting rollers 1 mesh with one driving means 112 each which is designed as an intermediate gear and is rotatably secured at a suitable location to the lateral stand 113 of the conveyor device, e.g. by means of a bearing pin 114 and bearings 115. In the embodiment illustrated in FIG. 13 the gear 111 and intermediate gear 112 are arranged in alternating sequence. For the sake of simplicity the intermediate gear 112 may, on principle, be a part which is identical with the part integrally molded as supporting disk 7 and gear 111; see FIG. 14.

In case of distances which need a greater pair-wise drive it is only necessary to provide a chain 116, a toothed belt or the like, as in FIG. 13, and to pass said driven chain 116 over all the intermediate gears 112 so that they mesh with the chain 116. When the chain 116 is moved in the direction of the arrow *a* in FIG. 13, the intermediate gears 112 are rotated in the direction of the arrow *b* which, in turn, causes all the deflecting rollers 1 whose gears 111 provided at the supporting disks 7 mesh with the intermediate gears 112 to rotate at equal speed in the direction of the arrow *c*.

For the common drive it is only necessary that the driving unit located optionally in the center of the track has a matching intermediate gear (equal modulus) or drives one, two or more gears via a chain or the like.

Of course, it is also possible — as mentioned before, to arrange the gears 111 and intermediate gears 112 such that one intermediate gear 112 each is provided between the gears 111 of two deflecting rollers 1, rather than one gear 111 and one intermediate gear 112 in alternating sequence. In this case only two intermediate gears 112 are required for driving the gears 111 of four successively arranged deflecting rollers 1.

On the whole, the invention offers, inter alia, the following advantages:

1. With alternating arrangement all the driven rollers can be driven at constant speed by simple means.

2. The supporting disks may be designed either as gears, pulleys (for V-belts, flat belts or round belts), sprocket wheels or the like and, if required, may also perform the function of confining the track.

3. The supporting disks may be used also with normal known deflecting rollers to reduce the costs of driving them.

I claim:

1. In an article conveyor having a plurality of track sections arranged to define a conveying track, each track section comprising:
   rotary housing means mounted for rotation, said rotary housing means including:
   wall means defining an inner bore, and
   a plurality of circumferentially spaced recesses formed in said wall means;
   each recess having an inner end opening into said bore and an outer end opening outwardly of said housing means;
   a plurality of spheres rotatably mounted in said recesses for free rotation in all directions;
   said spheres each having a diameter which is larger than the inner and outer recess ends such that said spheres are retained by said recesses, with an outer portion of each sphere projecting through said outer end of its respective recess to support articles being conveyed, and an inner portion of each sphere projecting through said inner end of its respective recess and into said bore for free rotary movement therein.

2. A conveyor according to claim 1 wherein each sleeve includes a plurality of apertures, other than said recesses, for admitting dirt, dust, and the like.

3. A conveyor according to claim 1 wherein said wall means comprises a pair of radially spaced walls, each of said walls containing aligned openings to define said recesses.

4. A conveyor according to claim 1 wherein said rotary housing means comprises a plurality of sleeves aligned axially, and a pair of supporting discs located at the ends of said aligned sleeves to couple said sleeves together.

5. In an article conveyor having a plurality of track sections arranged to define a conveying track, each track section comprising:
   a hollow sleeve having a plurality of circumferentially spaced recesses;
   said sleeve being mounted for rotation;
   a support member located within said sleeve;
   said support member having an outer cylindrical support surface;
   a plurality of spheres rotatably disposed in said recesses for rotation in all directions;
   the diameter of each sphere being larger than its associated recess such that said recess retains said sphere within said sleeve;
   inner portions of said spheres being supportably engaged by said cylindrical support surface to position outward portions of said spheres radially outwardly of said sleeve in contacting relation with articles being conveyed.

6. An article conveyor according to claim 5 wherein said sleeve and said support member are relatively rotatable, with one of said sleeve and said support member being driven to rotatably drive said spheres through frictional contact with said support surface.

7. An article conveyor according to claim 5 wherein said sleeve is freely rotatable relative to said supporting member such that said spheres rotatably travel around the circumference of said support surface.

8. An article conveyor according to claim 5 wherein said sleeve and said support member are rigidly inter-connected for common rotation.

9. An article conveyor according to claim 5 wherein said support member is arranged to be driven relative to said sleeve so as to frictionally drive said spheres.

10. An article conveyor according to claim 9 wherein said support member comprises an endless belt passing axially through said sleeve; said belt being arranged to be driven axially through said sleeve to frictionally rotate said spheres about axes that are disposed transverse to the axial direction of said sleeve.

11. An article conveyor according to claim 9 wherein said support member is rotatably driven about an axis which is coincident with the axis of said sleeve to frictionally drive said spheres about axes that are parallel to the axis of said sleeve.

* * * * *